Feb. 3, 1953
A. V. BEDFORD
2,627,547
GAMMA CONTROL
Filed April 29, 1948
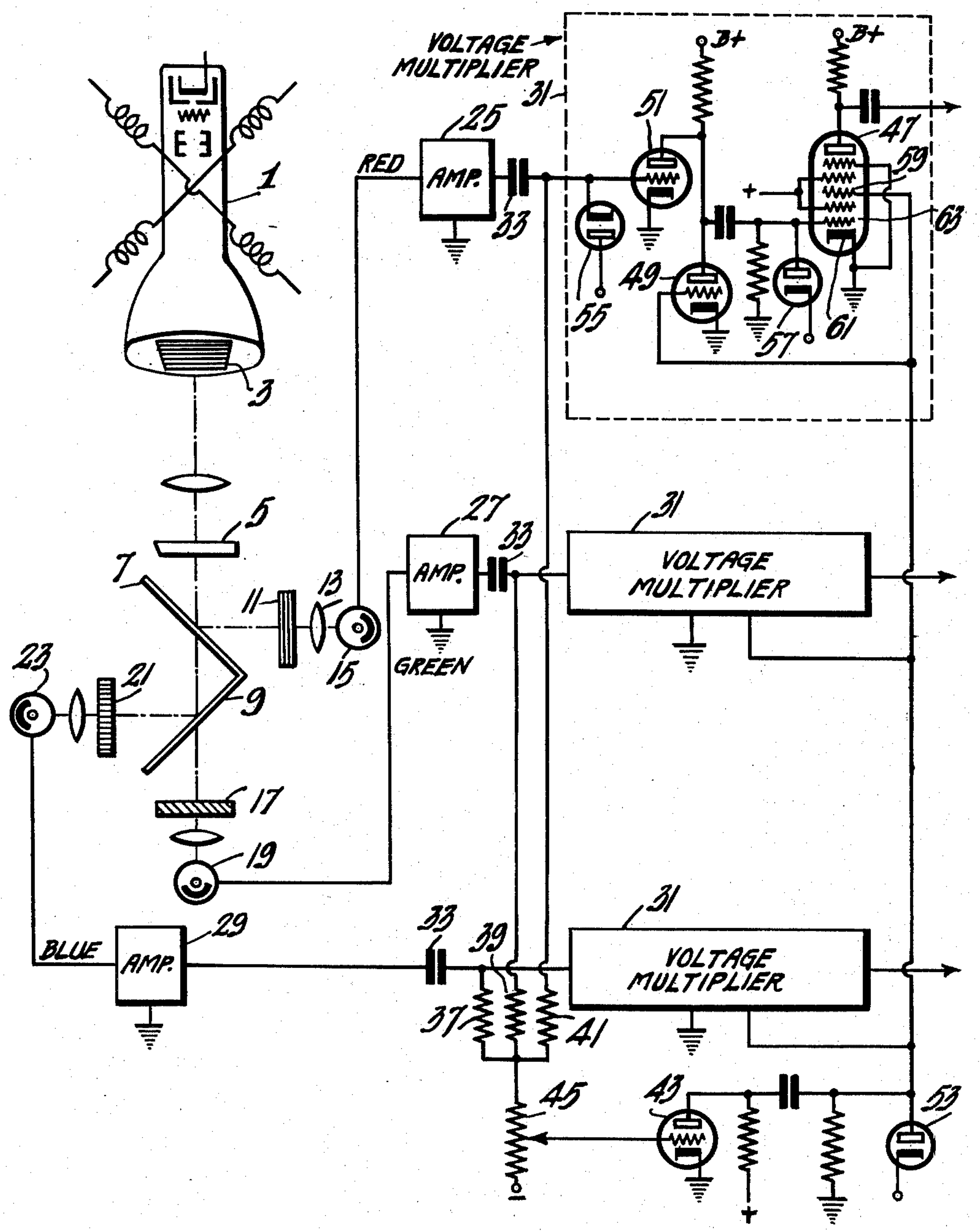
INVENTOR
Alda V. Bedford
BY Oliver A. Mitchell
ATTORNEY Patented Feb. 3, 1953 2,627,547

UNITED STATES PATENT OFFICE 2,627,547

GAMMA CONTROL

Alda V. Bedford, Princeton, N. J., assignor to Radio Corporation of America, a corporation of Delaware Application April 29, 1948, Serial No. 23,892

10 Claims. (Cl. 178—5.4)

This invention relates to the electrical control of optical gamma, and more particularly to gamma control for color television.

Gamma, or "contrast," as it is sometimes called, may be defined as a relative difference in degree of light intensity of image shading.

There are three fundamental steps in the transmission of images. These are the perception, the transfer, and the ultimate reproduction. The perception is achieved in a television camera which contains an image pickup tube. The image pickup tube must change variations in light intensity into electrical signals which, in the case of television, are transmitted to a remote location. The transferring device must carry signal intelligence representative of the image to a remote location, where the electrical signal train is reconverted into an image for perception by the eye of the observer. The overall gamma of the system is the result of the combined transfer (or input-output) characteristic of the pickup tube, the amplifier and the reproducing tube.

It might be assumed that for accurate reproduction the most desirable condition would be a linear relationship between the object brightness and image brightness which would be represented by a gamma of one.

The usable range of brightness values of the reproduced image is generally less than that present in the original scene to be transmitted. Therefore, a linear relation cannot be used if some sort of brightness variations in the image are to be produced for all brightness variations in the scene. It has been found in photography that the eye is more nearly satisfied if the necessary compression is such that a linear curve is obtained when the image brightness is plotted against object brightness, both values being represented on a logarithmic scale. The slope of the curve is defined as the gamma. Compression of the object brightness range into a smaller image brightness range represents a gamma less than one, and the image appears "flat."

Sometimes it is preferred to use a gamma of one or more and accept a complete loss of brightness gradations at one end or both ends of the range—usually the dark end. Detail in the shadows is then lost, but the picture appears to be more snappy or contrasty. Various slopes and shapes of curves may be used to obtain special or unnatural effects for dramatic purposes.

In order to provide for a most desirable overall transfer characteristic, it is convenient to have a gamma control having an adjustable characteristic in order to provide flexibility.

Various systems have heretofore been proposed for the control of gamma in black and white television systems. Some include adjustment by the selection of tube characteristics. Systems involving corrections by non-linear resistors functioning in accordance with amplitude have also been suggested. Correction by degeneration in connection with a non-linear tube and correction by division of control characteristics such as a change in gain of individual amplifier channels representative of different amplitude ranges has also been suggested.

An improved gamma control arrangement is suggested in the U. S. Patent 2,519,238 dated August 15, 1950, of Vernon J. Duke et al. A serially connected diode having a shunt resistance is biased to function as an open circuit in one direction from a predetermined voltage amplitude in order to change the transfer characteristic of the circuit involving the diode and the resistor at the predetermined signal amplitude value.

Although the comparatively simple arrangement proposed by Vernon J. Duke et al. and referred to above provides extremely satisfactory results for the control of gamma in the transmission of television images in monochrome, an arrangement of this sort is not satisfactory for gamma control in the transmission of images in substantially their natural color.

In the case of monochrome television, it is common to control gamma merely by passing the video signal (with D.-C. component) through a suitable non-linear amplifier. If the gamma is to be increased, the arrangement is such that the plate-current versus grid voltage rises more for a given grid change in the near-white region than in the near-black region. Thus, the extreme white areas are reproduced whiter in proportion than are the medium white areas.

If three such non-linear amplifiers were used for the tri-color signals, the three signals would be amplified unequally when they were not of equal amplitudes. Thus, the three colors would be reproduced in different relative values than that existing in the original signal.

This will be more readily understood when it is appreciated that in a simultaneous type system each of the plurality of component color image representative signal trains is generally at any one time at a different amplitude level. The expansion or compression of the different component color image representative signals by an amount depending upon their respective instantaneous amplitude will therefore cause each of the different selected component color image representative signal trains to be expanded or compressed by a different amount. This, of course, will not result in true gamma control in the ultimate color image.

If, for example, three colors are employed for the reproduction of the image in its natural color, each of the colors would be reproduced in different relative values than the relative value existing in the original scene. The ultimate effect would be that a "reddish" object would be reproduced redder. This effect would be in addition to the desired increase in gamma. White areas would be properly reproduced with increased gamma, but areas having an unequal mixture of colors would be reproduced in improper hue and saturation.

In order to provide for true gamma control of the color image, it is necessary to control the instantaneous amplification of each of the selected component color image representative signal trains in accordance with the combined instantaneous amplitudes of all the selected component color image representative signal trains.

According to this invention, gamma control for simultaneous type color television is provided by mixing the selected component color image representative signal trains to obtain a voltage which is employed to control the amplification of each of the different selected component color image representative signal trains.

A primary object of this invention is to provide an improved television system.

Another object of this invention is to provide for improved gamma control of color television systems.

Other and incidental objects of the invention will be apparent to those skilled in the art from a reading of the following specification and an inspection of the accompanying drawing, which illustrates this invention in one of its forms.

Turning now in more detail to the drawing, there is shown one form of color image pickup arrangement which involves a blank scanning raster producing tube 1 which may, for example, take the form of the popular kinescope. The tube 1 projects a scanning raster 3 on a color transparency or color film 5.

Light from the image 5 is directed to a half-silvered mirror arrangement including mirrors 7 and 9.

Mirrors 7 and 9 may either be of the well known half-silvered type, which is partially reflective and partially transmissive to the light, or may, for example, take the form of the popular dichroic type of mirror arrangement which has color selective properties.

If mirror 7 is of the half-silvered type, a part of the light from image 5 will be reflected through a red filter 11 and through a lens 13 to a light responsive device 15. Because of the red filter 11, the light responsive device 15 will respond only to the red color component of the image on the film 5.

A portion of the light from image 5 will be transmitted directly through mirrors 7 and 9 to a green filter 17, which passes only the green color component of the image on film 5 to the light responsive device 19.

Likewise, a part of the light coming through mirror 7 will be reflected from mirror 9 through a blue filter 21, thus causing the blue color component of the image on film 5 to be directed upon a light sensitive device 23, which will furnish a signal train representative of the blue color component of the image on film 5.

An arrangement of this nature for the development of simultaneous type color video signals is well shown and described in an article entitled "Simultaneous All-Electronic Color Television," beginning on page 459 of the "RCA Review" for December 1946.

Although such an arrangement is shown in the drawing for dividing light, it is not intended that this invention be limited to the use thereof, but an arrangement may be employed such as that shown and described in the U. S. Patent 2,560,351 dated July 10, 1951, of Ray D. Kell and George C. Sziklai entitled "Simultaneous Color Television."

There has been suggested an arrangement for simultaneous pickup of several selected component color images by the use of three independent camera tubes, each having an associated component color filter. Such an arrangement is also suitable for employment in the operation of this invention.

The use of cross dichroic filters, as suggested in the copending U. S. application of Alfred C. Schroeder, Serial No. 731,647, filed February 28, 1947, entitled "Component Color Separator," is also a suitable arrangement.

Signals representative of the red color component of the image on film 5 are amplified in amplifier 25. Amplifier 27 is provided for the green color component signals, and amplifier 29 is likewise provided for the blue color component signals.

The selected component color image representative signals amplified in amplifiers 25, 27 and 29 are each coupled to their respective voltage multipliers 31 through condensers 33.

A portion of the signal from amplifier 25 is combined with a portion of the signals from amplifiers 27 and 29 in a mixer arrangement including resistors 37, 39 and 41.

Although a combination of resistors 37, 39 and 41 is illustrated, a mixer circuit involving vacuum tubes may be employed.

The combined signals are transmitted to tube 43 through an adjustable control 45.

The values of resistors 37, 39, 41 and 45 are so chosen that there results little, if any, cross talk between the channels. The employment of vacuum tubes in a mixer circuit would, of course, prevent any possible cross talk between color channels.

Tube 43, whose amplification characteristic is properly selected in accordance with the desired effect, transmits its output signal to the gain control electrode of the variable gain tube 47 in each of the voltage multipliers. Energy from tube 43 is also transmitted to a tube 49 of the voltage multiplier which adds its signal output to the individual color image representative signal obtained from amplifier tube 51.

Diode 53, diode 55 and diode 57 are employed as D. C. setters. A simple form of D. C. setter is illustrated. Any suitable D. C. setter may be employed. It is necessary to employ D. C. setters where illustrated in order to provide a proper amplification and control of the video signals. It is well known in the television art that whenever video signals are to be changed in characteristic, such as, for example, expansion or contraction, as suggested by the present invention, it is necessary to establish the proper reference value. This can be accomplished simply and accurately by the employment of direct current reinserters, or, as they are sometimes called, D. C. setters.

The operation of the voltage multiplier may readily be understood when it is remembered that the amplification factor of certain tubes depends upon the potential applied to one of their control electrodes. Such a tube is employed as tube 47.

The amplification factor of tube 47 is dependent upon the potential of control electrode 59 with respect to its associated cathode 61. The gain in amplification of the signal applied to control electrode 63 is therefore dependent upon the potential of control electrode 59.

If the frequency of control potential is high enough to pass through the coupling circuits following the controllable gain tube, the gain control potential is reflected as amplitude modulation in the output signal.

It will be remembered that in the practice of this invention, it is necessary to change the gain of tube 47 at video frequency. It will be noticed that there is no filter in the control circuit involving tube 43.

In order to prevent the expression of the gain control in the output circuit, it is necessary to add a complementary potential to the input circuit of tube 47. This is accomplished by applying the control potential to tube 49 in order to counteract the effect of the control potential on control electrode 59 insofar as its expression in the output circuit of tube 47 is concerned. The effect produced by tube 49 will not interfere with the change in gain of tube 47. The type tube 49 and its associated circuit elements may be so chosen as to accomplish a complete balancing out of the effect of the control potential on control electrode 59, insofar as the expression of the control potential in the output circuit of tube 47 is concerned.

It will thus be seen that the change in gain or amplitude of each of the selected component color image representative signal trains will be controlled in accordance with the combined amplitudes or sum of all the selected component color image representative signal trains. The reproduced image will then take on an accurate hue and color tonal quality which is necessary for a proper reproduction of color images.

Having thus described the invention, what is claimed is:

1. A gamma control for color television systems employing a plurality of different component color image representative video signals comprising in combination a signal mixer for combining a portion of each of said plurality of different component color image representative video signals, said signal mixer having a signal output circuit, a controllable voltage multiplier for each of said component color image representative video signals, means for controlling the gain of said controllable voltage multiplier, said gain control means having a gain control connection, and a connection between said mixer output circuit and said gain control connection.

2. A light gamma control for color television systems involving a plurality of component colors, a plurality of signal channels for different component color image representative video signals, a signal mixer, said signal mixer connected to receive all of said signals, said signal mixer having a signal output circuit, an amplifier connected in each of said channels following the connection of said mixer for each of said plurality of different component color image representative video signals, said amplifier having controllable gain, and a gain control connection between said mixer output circuit and said amplifier.

3. A light gamma control for color television systems involving a plurality of component colors, a signal mixer, a channel for each of a plurality of different component color image representative video signals, said signal mixer connected to a plurality of said channels to receive and combine without modification said video signals and having a signal output circuit, an amplifier for each of said plurality of different component color image representative video signals, said amplifier having an input circuit, said amplifier having gain controllable at video frequency, said mixer circuit connected ahead of said amplifier input circuit and means for controlling the gain of each of said amplifiers, said gain control means having a gain control connection, a connection between said mixer output circuit and said gain control connection.

4. A gamma control for color television systems involving a plurality of component colors comprising in combination terminals to receive component color image representative video signals, a signal mixer for combining a portion of each of said signals, said signal mixer having a signal output circuit, a voltage multiplier having controllable gain, said voltage multiplier having an input connected to said terminals and means for controlling the gain of each of said voltage multipliers, said gain control means having a gain control connection to said mixer output circuit.

5. A gamma control for color television systems involving a plurality of component colors comprising in combination a source of a plurality of component color image representative video signals, a signal mixer connected to said source for combining said signals, an amplifier for each of said signals, means for controlling the gain of said amplifier, said amplifier having an input circuit, said amplifier input circuit also connected to said source and a connection between said mixer output circuit and said gain control means.

6. A gamma control arrangement for color television systems comprising in combination a signal channel for each of a plurality of selected component color image representative signal trains, an amplifier for each of said channels, means for controlling the gain of each of said amplifiers, a signal mixer having an input and output circuit, a connection ahead of said amplifier between each of said signal channels and said mixer input circuit, and a connection between said amplifier gain control means and said mixer output circuit.

7. A gamma control for color television comprising in combination, a signal channel for each of a plurality of selected component colors, a plurality of controllable voltage multipliers consisting of multiple control electrode electron discharge devices, one of said multipliers connected in each of said signal channels by a connection to one of its control electrodes, a gain control circuit connection between all of said channels ahead of the connection of said multipliers in said channels and another control electrode of each of said controllable voltage multipliers.

8. A gamma control for color television comprising in combination, a signal channel for each of a plurality of selected component colors, a controllable voltage multiplier connected in each of said signal channels, said controllable voltage multiplier consisting of a multiple control electrode discharge device, a gain control circuit connection between all of said channels and a control electrode of each of said controllable voltage multipliers and a neutralization connection between said gain control circuit connection and each of said channels in opposite polarization in said channels to the gain control connection on said voltage multipliers.

9. A gamma control for color television comprising in combination, a signal channel for each of a plurality of selected component colors, a controllable voltage multiplier consisting of a multiple control electrode electron discharge device, said multiplier connected in each of said signal channels by a connection to one of its control electrodes, a gain control circuit connection between all of said channels ahead of the connection of said multipliers and another control electrode of each of said voltage multipliers, and a neutralization connection between said gain control circuit connection and each of said channels in phase opposition in said channels to the gain control phase.

10. Apparatus for controlling the image gamma in a color television system comprising the combination of means for developing a plurality of different selected component color image representative video signals, means for deriving a control signal substantially proportional to the sum of a plurality of said selected component color representative video signals and means for controlling the instantaneous amplification of each of said selected component color image representative video signals with said control signal thereby to change the gamma of said system.

ALDA V. BEDFORD.

REFERENCES CITED

The following references are of record in the file of this patent:

UNITED STATES PATENTS

| Number | Name | Date |
|---|---|---|
| 2,083,374 | Harley | June 8, 1937 |
| 2,231,668 | Hall | Feb. 11, 1941 |
| 2,389,039 | Goldsmith | Nov. 13, 1945 |
| 2,406,760 | Goldmark | Sept. 3, 1946 |
| 2,413,706 | Sunderson | Jan. 1, 1947 |
| 2,415,051 | Thompson | Jan. 28, 1947 |
| 2,423,769 | Goldsmith | July 8, 1947 |
| 2,434,561 | Hardy | Jan. 13, 1948 |
| 2,492,926 | Valensi | Dec. 27, 1949 |

OTHER REFERENCES

Principles of Television Engineering, Fink, pages 204–206.